(12) United States Patent
Kuzmenka

(10) Patent No.: US 7,525,357 B2
(45) Date of Patent: Apr. 28, 2009

(54) CIRCUIT AND METHOD FOR ADJUSTING A VOLTAGE DROP

(75) Inventor: Maksim Kuzmenka, Munich (DE)

(73) Assignee: Qimonda AG, Munich (DE)

( * ) Notice: Subject to any disclaimer, the term of this patent is extended or adjusted under 35 U.S.C. 154(b) by 97 days.

(21) Appl. No.: 11/638,324

(22) Filed: Dec. 13, 2006

(65) Prior Publication Data

US 2008/0143427 A1 Jun. 19, 2008

(51) Int. Cl.
*H03K 3/017* (2006.01)
(52) U.S. Cl. ........................ 327/172; 327/108
(58) Field of Classification Search .................. None
See application file for complete search history.

(56) References Cited

U.S. PATENT DOCUMENTS 5,818,269 A * 10/1998 Brown et al. ............... 327/108

6,624,671 B2 * 9/2003 Fotouhi ..................... 327/112
7,321,246 B2 * 1/2008 Nishimura .................. 327/112

* cited by examiner

*Primary Examiner*—Cassandra Cox
(74) *Attorney, Agent, or Firm*—Slater & Matsil, L.L.P.

(57) ABSTRACT

An integrated circuit includes a circuit for adjusting a voltage drop. The circuit includes a reference voltage node, an output node and a driver circuit coupled between the reference voltage node and the output node. The driver circuit includes an impedance causing a current flow through the driver circuit when a reference voltage is applied to the reference voltage node. A current source is coupled to the driver circuit to impress an adjustment current based on a control current such that the current flow through the driver circuit is adjusted to yield a desired voltage drop across the driver circuit.

27 Claims, 11 Drawing Sheets

CIRCUIT AND METHOD FOR ADJUSTING A VOLTAGE DROP

TECHNICAL FIELD

The present invention relates to a circuit and a method for adjusting a voltage drop and, in particular, to a method and a circuit for use in an off-chip driver or a mixed mode off-chip driver.

BACKGROUND

In modern digital and analog chips, digital signals are transmitted via one or more signal lines coupling a transmitting circuitry to a receiving circuitry. For transmitting digital "0" states and "1" states via the signal line, specific voltage levels are effected on the signal line. The specific voltage level caused on the signal line depends on the output impedance of the transmitting circuitry and on the current on the signal line. At the side of the receiving circuitry, a "0" state or a "1" state is detected by comparing the voltage on the signal line to a receiver reference voltage.

Normally, the characteristic impedance of the signal line should be matched to the output resistance of a driver in the transmitting circuitry and a termination resistance in the receiving circuitry in order to avoid parasitic signal reflections. Thus, the amplitude of a data eye obtained at the receiving circuitry can be appropriately positioned with respect to the reference voltage.

The above considerations are of importance in off-chip drivers (OCDs) and, in particular, push-pull off-chip drivers, which are widely used in modern digital and analog chips to drive digital signals onto a signal bus coupling a transmitting circuitry to a receiving circuitry. Generally, the OCD should provide for a certain impedance in order to obtain a matched termination of the printed circuit board transmission lines, or coaxial cables, connecting the OCD to a receiving circuitry so that requirements for a desired signal swing on the transmission lines can be fulfilled.

What is needed are means for providing an adjusted voltage drop across a circuit such that a desired signal swing on a signal line connected to an output node can be obtained.

SUMMARY OF THE INVENTION

In accordance with embodiments of the present invention, an integrated circuit includes a circuit for adjusting a voltage drop. The circuit includes a reference voltage node, an output node, a driver circuit and a current source. The driver circuit is coupled between the reference voltage node and the output node and includes an impedance causing a current flow through the driver circuit when a reference voltage is applied to the reference voltage node. The current source is coupled to the driver circuit to impress an adjustment current based on a control current such that the current flow through the circuit is adjusted to yield a desired voltage-drop across the circuit.

BRIEF DESCRIPTION OF THE DRAWINGS

The forgoing and other features and advantages of embodiments of the invention will be more readily appreciated and better understood by reference to the following detailed description, which proceeds with reference to the accompanying drawings.

FIG. 2b shows a simplified schematic view of the push-pull driver of FIG. 2a;

FIG. 3b shows a simplified schematic of the push-pull driver of FIG. 3a;

FIGS. 7b and 7c show switches for the push-pull driver shown in FIG. 7a;

FIG. 11b shows a calibration code useable for a binary set-up of the push-pull driver shown in FIG. 11a.

DETAILED DESCRIPTION OF ILLUSTRATIVE EMBODIMENTS

Before embodiments of the present invention are described in more detail, reference is made to FIGS. 8 to 11b showing conventional approaches of push-pull drivers.

Figure 8:
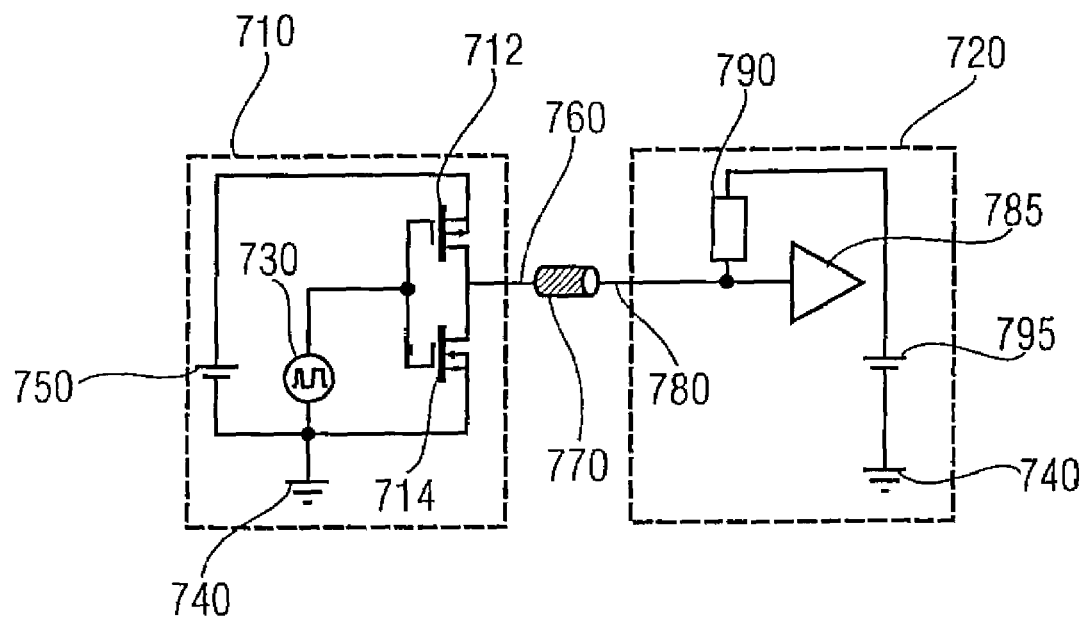
FIG. 8 shows a conventional push-pull driver connected to a receiver by a signal bus.

In FIG. 8, a conventional push-pull OCD 710 is shown, which comprises a first transistor 712 and a second transistor 714 which are of opposite channel type. In FIG. 8, the first transistor 712 is a P-MOS transistor and the second transistor 714 is a complementary N-MOS transistor. Alternatively, the complementary transistors could be formed by a PNP transistor and a NPN transistor. A digital signal generator 730 is connected between a reference voltage level 740, such as ground, and the gates of the first and second transistors 712 and 714. A source of the first transistor 712 is connected to a positive voltage node of a power supply 750 and a source of the second transistor 714 is connected to a negative voltage node of the power supply 750. Drains of the first and second transistors 712 and 714 are connected to an output node 760 of the OCD. The output node 760 is connected to an input node 780 of a receiving circuitry 720 via a signal line 770. A receiver 785 is connected to the input node 780. A termination resistor 790 is connected between the input node 780 and the positive voltage node of a power supply 795. The negative voltage node of the power supply 795 is connected to a reference voltage potential 740, such as ground.

In operation, the digital signal generator 730 generates a sequence of high and low states, i.e. logic "0" states and logic "1" states. Depending on the generated state, the first transistor 712 or the second transistor 714 are switched on. If the first transistor 712 is switched on, the output node 760 is connected to the positive voltage node of the power supply 750, and if the second transistor 714 is switched on, the output node is connected to the negative voltage node of the power supply 750.

Accordingly, voltage levels corresponding to the logic states are generated on the signal line 770 and can be detected by the receiver 785.

In high speed data transmission systems such as the processor front-side-bus of a memory interface, the OCD should provide a certain impedance for a matched termination of the printed circuit board transmission lines so that requirements for a desired signal swing are fulfilled. The signal line 770 can represent one of a plurality of printed circuit board transmission lines of a data bus. Normally, the characteristic impedance of the data bus should be matched to the resistance of the driver in the OCD and the termination resistor in the receiving circuitry 720, which may be a processor chip. In this case, no parasitic signal reflections are present and high data rates can be obtained.

In some modern systems (such as graphic DDR III), a termination resistor is connected to the positive voltage node of the power supply. A simplified schematic reflecting this situation is shown in FIG. 9 of the present application.

Connecting a termination resistor to the positive voltage node of the power supply is advantageous since it is not necessary to generate an additional termination voltage (Vtt), which is normally half of the supply voltage. Moreover, there is no current consumption if the driver is in a "1" state.

Figure 9:
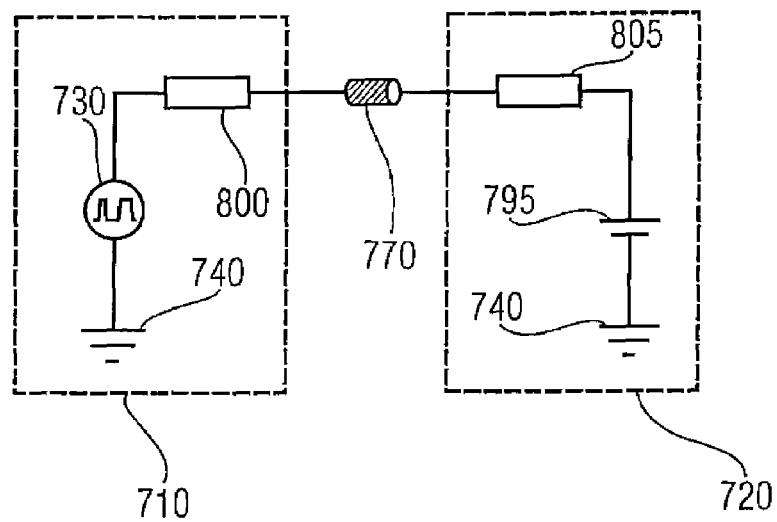
FIG. 9 shows a simplified schematic of the system of FIG. 8.

In the simplified schematic of FIG. 9, the output impedance of the OCD 710 is shown as a resistor 800 and the input impedance of the receiver 720 is shown as a resistor 805. If the output impedance 800 of the driver 710 and the input impedance 805 of the receiver 720 (as seen by the transmission line 770) is matched to the characteristic impedance of the transmission line, e.g., the signal line on the printed circuit board, a signal swing on the transmission line will be exactly one half of the supply voltage, and an optimum receiver reference voltage Vref will be ¾ of the supply voltage. In this regard, it is to be noted that the signal generator 730 causes application of the supply voltage in case of a logic "1". Generally, the supply voltage may be 1.5 Volt, the characteristic impedance of the transmission line may be 50 Ohm and, therefore, the driver should provide for an output impedance of 50 Ohm and the receiver should provide for an input impedance of 50 Ohm in order to obtain a matched system.

Figure 10:
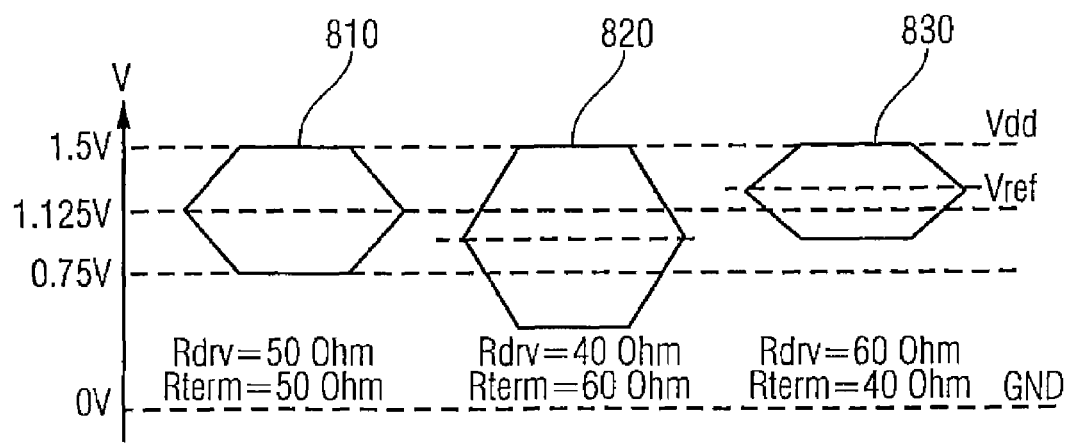
FIG. 10 shows data eyes at the receiver of the system of FIG. 9 for a matched case and for mismatched cases.

The data eye obtained at the receiver for such a matched case is shown in FIG. 10 at 810.

If the accuracy of the driver or receiver impedance is not sufficiently high, the "0" level will be shifted and, consequently, the optimum reference voltage will be shifted. Data eyes obtained for mismatched cases are shown in FIG. 10 at 820 and 830. In case of a mismatch of one of the resistors, the amplitudes of the data eye will be larger or lower. To be more specific, the amplitude of the "0" level is shifted, as can be derived from the data eyes 820 and 830. In response thereto, the signal crossing point, i.e. the optimum reference voltage Vref at the receiver will be shifted down or up. In addition, the signal quality for mismatched cases will be worse because of signal reflections in the transmission line. However, practice shows that such signal reflections are only a secondary effect for impedance variations of ±10% at frequencies of 1 to 2 GHz.

Parameters of transistors and resistors used in OCDs can vary in a relatively wide range depending on the conditions during manufacturing thereof. Accordingly, the output impedance of the OCDs obtained can vary in a relatively wide range, sometimes up to ±30%. For a compensation of process variations, voltage variations and temperature variations, an OCD calibration is widely used. A simplified schematic of a conventional OCD with calibration is shown in FIG. 11a.

Figure 11A:
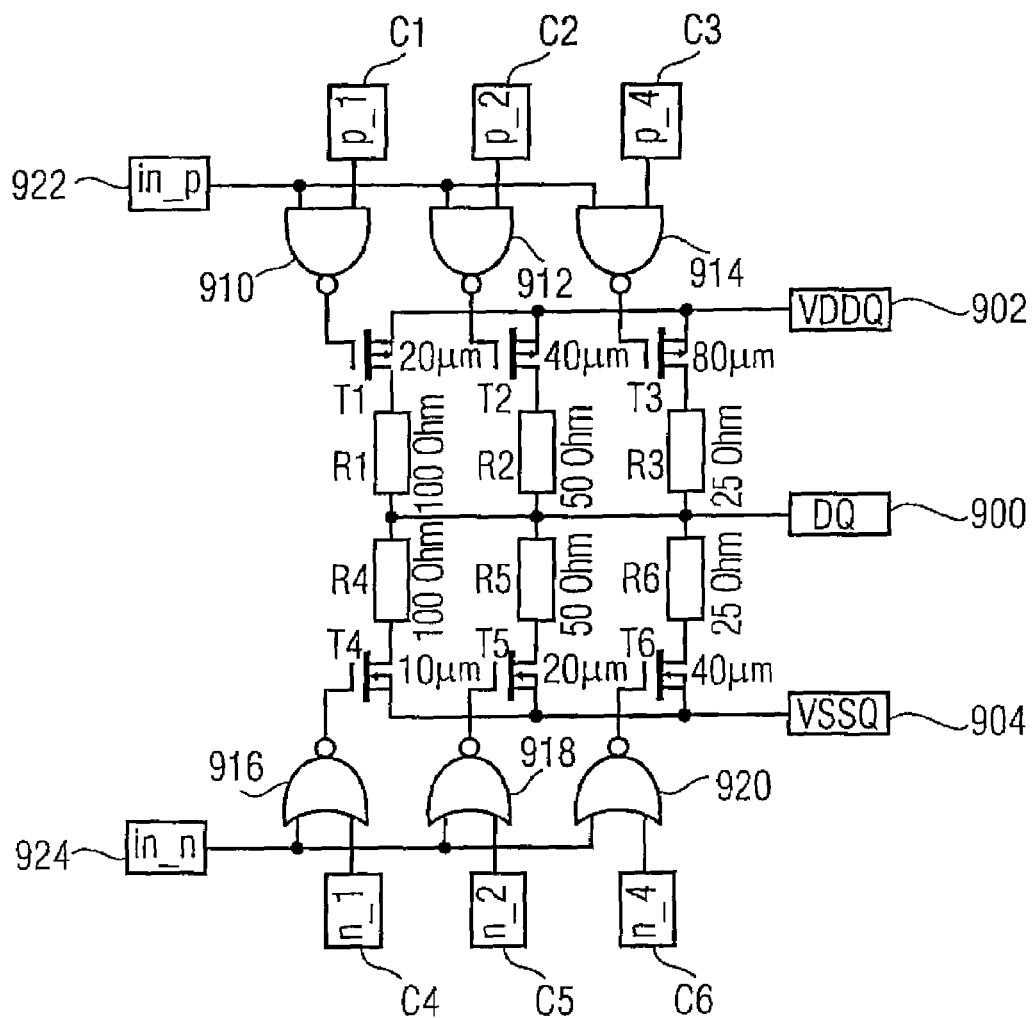
FIG. 11a shows a schematic view of a push-pull driver having an output impedance adjustable in a stepwise manner.

According to FIG. 11a, a plurality of pairs of OCD transistors T1 to T6 and associated OCD resistors R1 to R6 are provided. The transistor/resistor pairs, which are formed by the transistor T1 and the resistor R1, the transistor T2 and the resistor R2 and the transistor T3 and the resistor R3, are connected between an output node (DQ) 900 and a first reference voltage node (VDDQ) 902. The transistor/resistor pairs, which are formed by the transistor T4 and the resistor R4, the transistor T5 and the resistor R5 and the transistor T6 and the resistor R6, are connected between the output node 900 and a second reference voltage node (VSSQ) 904.

A first reference voltage (1.5 Volt, for example) is applied to the first reference voltage node 902, and a second reference voltage (ground, for example) is applied to the second reference voltage node 904. The gate of each of the transistors T1, T2 and T3 is connected to a respective NAND gate 910, 912, and 914. The gate of each of the transistors T4, T5 and T6 is connected to a respective NOR gate 916, 918 and 920. First inputs of the NAND gates 910, 912 and 914 are connected to an input signal node 922, and first inputs of the NOR gates 916, 918 and 920 are connected to an input signal node 924. The same input signal may be applied to the input signal nodes 922 and 924. A second input of each of the gates 910 to 920 is connected to a respective control input C1 to C6.

Control signals applied to the control inputs C1 to C6 are determined during calibration of the OCD shown in FIG. 11a. To be more specific, control signals are adjusted based on the output impedance of the OCD detected during calibration thereof. Depending on the control signals and depending on a desired signal level on the output node 900, those transistors/resistor pairs are connected between the output node and the respective reference voltage node, which result in an output impedance of the OCD which is closest to a desired target impedance (50 Ohm, for example).

In other words, which of the transistors T1, T2 and T3 will be turned on in case of a logic "1" at the input signal node 922 will depend on the value of a digital word applied to the control inputs C1, C2 and C3. Likewise, which of the transistors T4, T5 and T6 are turned on in case of a logic "0" at the input node 924 will depend on the value of a digital word applied to the control inputs C4, C5 and C6.

As it is indicated in FIG. 11a, the transistors T1 to T3 have different transistor widths and the resistors R1 to R3 have different resistances, so that different output impedances can be adjusted by connecting the respective transistor/resistor pairs between the output node and the first reference voltage node in a selected manner. Likewise, the transistors T4 to T6 have different channel widths and the resistors R4 to R6 have different resistances, so that the output impedance can be adjusted by connecting respective transistor/resistor pairs between the output node 900 and the second reference voltage node 904 in a selective manner.

In the example shown in FIG. 11a, the respective digital word C1 to C3 and C4 to C6 has three digits so that seven possible calibration steps are obtained for each logic level "0" or "1". For a more accurate calibration, a greater number of digits can be provided, such as 5 digits and 31 calibration steps. However, due to the circuitry required for each additional digit (resistor, transistor and logic gate), additional digits result in a dramatic growth of the OCD complexity and size. Moreover, all the subpieces of the OCD have to be perfectly synchronized, wherein a subpiece is represented by a respective transistor/resistor pair and an associated logic gate. The binary weight in between the neighboring parts has to be very accurate to allow for a monotonic calibration characteristic. Moreover, the minimum size (channel width) of the least significant transistor and resistor is limited, so that the step size of the stepwise calibration cannot be arbitrarily reduced.

Figure 11B:
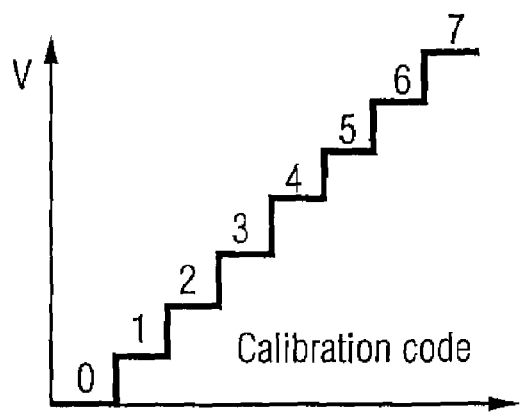

An example of a typical calibration curve for 3 digits and 7 possible calibration steps is shown in FIG. 11b. FIG. 11b shows the OCD output voltage (output is terminated to Vdd, i.e., the first reference voltage) as a function of the calibration code.

It has to be noted that the NAND gates 910 to 914 and the NOR gates 916 to 920 represent exemplary logic gates only and could be replaced by other logic gates appropriate to provide for the desired functionality.

Accordingly, the calibration approach described in FIG. 11a allow for an adjustment of the output impedance in a stepwise manner, wherein the complexity of the circuitry is greatly increased with reduced step size. Moreover, it is not possible to reduce the step size arbitrarily due to the limitations with respect to the size of the least significant transistor/resistor pair.

The present invention proposes another technique for the adjustment of a voltage swing without adding significant complexity and without requiring significant additional chip area.

Figure 1:
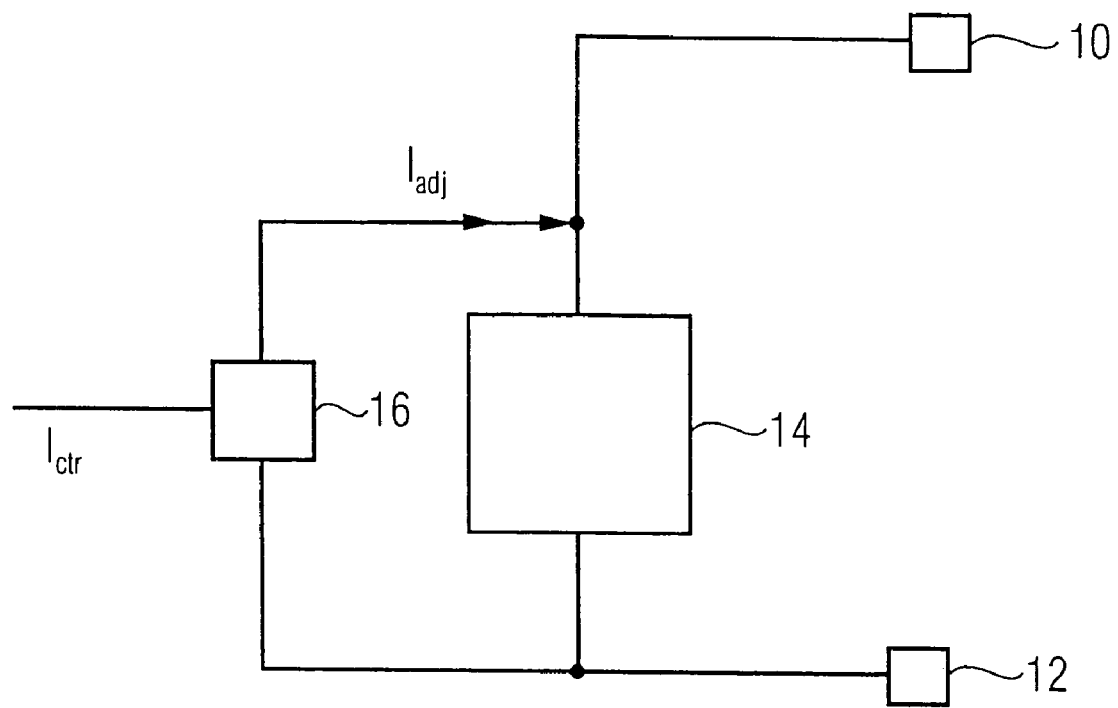
FIG. 1 shows a schematic view of an apparatus for adjusting a voltage drop according to an embodiment of the invention.

According to FIG. 1, embodiments of the present invention comprise a circuit including a reference voltage node 10, an output node 12 and a driver circuit 14 coupled between the reference voltage node 10 and the output node 12 and comprising an impedance causing a current flow through the driver circuit if a reference voltage is applied to the reference voltage node. Moreover, a current source 16 is coupled to the driver circuit 14 to impress an adjustment current based on a control current Ictr such that the current flow through the driver circuit 14 is adjusted to yield a desired voltage drop across the driver circuit 14.

In other words, an adjustment current Iadj is impressed through the driver circuit 14, in addition to a current caused by the reference voltage at the reference voltage node 10. The control current Ictr can be changed in a continuous (i.e., stepless) manner, so that the voltage drop across the driver circuit 14 can be changed in a continuous manner and, therefore, an output swing at the output node 12 can be changed in a continuous manner.

As far as the current flow through the driver circuit 14 caused by the reference voltage is concerned, it is to be noted that the same can take place from the reference voltage node 10 via the driver circuit 14 through the output node 12, via a transmission line connected to the output node 12 and a termination resistor in a receiver circuitry.

The control current Ictr which determines the adjustment current does not originate from the driver circuit, but is supplied via an additional input and, therefore, is independent on the operation of the driver circuit. Thus, the control current is also referred to as a control reference current herein. In embodiments of the invention, the control current does not substantially contribute to the output impedance of the driver circuit as discussed further below. Moreover, in embodiments of the invention, the current source is implemented to not substantially affect the output impedance of the driver circuit.

In embodiments of the invention, the circuit including the driver circuit 14 is part of an integrated circuit device, such as an integrated circuit chip. In embodiments of the invention, the circuit chip is a memory controller chip or a memory chip, such as a DRAM chip, of a memory system. In embodiments of the invention, the driver circuit is at least part of an off-chip driver. In embodiments of the invention, the control current is generated on an integrated circuit device including the driver circuit. In other embodiments of the invention, the control current is generated external to the integrated circuit device including the driver circuit.

In embodiments of the invention, the control current required to obtain a desired or target voltage drop across the driver circuit 14 can be determined during a calibration procedure. In embodiments of the invention, the calibration procedure can take place during manufacturing or testing of the driver circuit. In other embodiments of the invention, on-chip calibration circuits are used to maintain the calibration with respect to changes in operating voltage, changes in temperature, changes in load impedance and/or changes in the general performance of the driver circuit with time. Such on-chip calibration can take place during operation of the driver circuit.

In operation, the determined current is provided by an appropriate control current supply and applied to the reference current input. Since the control current is obtained at an additional input and provided by a control current supply, it can be adjusted independent of the operation of the driver circuit.

In embodiments of the invention, the control current is adjusted to compensate for a deviation of the impedance of the driver circuit from a target impedance. To be more specific, the control current is adjusted such that the adjustment current causes the voltage drop to be such as if the impedance of the driver circuit had the target impedance within tolerances of typically plus or minus 20%, 10% or 5%, with other tolerance ranges being possible.

In embodiments of the present invention, the control current is adjusted and the current source is switched to cause desired levels of the voltage drop at desired times. In other words, the control current may be used to provide for pre-emphasis of specific signal states represented by the voltage drop across the driver circuit.

In embodiments of the invention, the current source is able to provide for an adjustment current such that the voltage drop across the driver circuit can be increased or decreased. The present invention is particularly suited for adjusting the output swing of a push-pull off-chip driver. Accordingly, embodiments of the present invention are explained hereinafter referring to off-chip drivers. However, it goes without saying that the present invention is also applicable to other applications, in which a voltage drop across a driver circuit, such as an on-chip driver circuit, is to be adjusted and, therefore, the invention is not restricted to the specific embodiments described. The term driver circuit is intended to encompass circuits appropriate to drive specific voltage states on an output node thereof. In embodiments of the invention, the specific voltage states correspond to logic levels, such as "0" and "1".

In the drawings and the description, specific exemplary values of channel widths and resistances are indicated. It is to be noted that the indicated values are exemplary only and not restrictive.

Throughout the drawings, identical elements or elements having an identical functionality are provided with identical reference numbers and a repeated explanation of such elements is omitted.

Figure 2A:
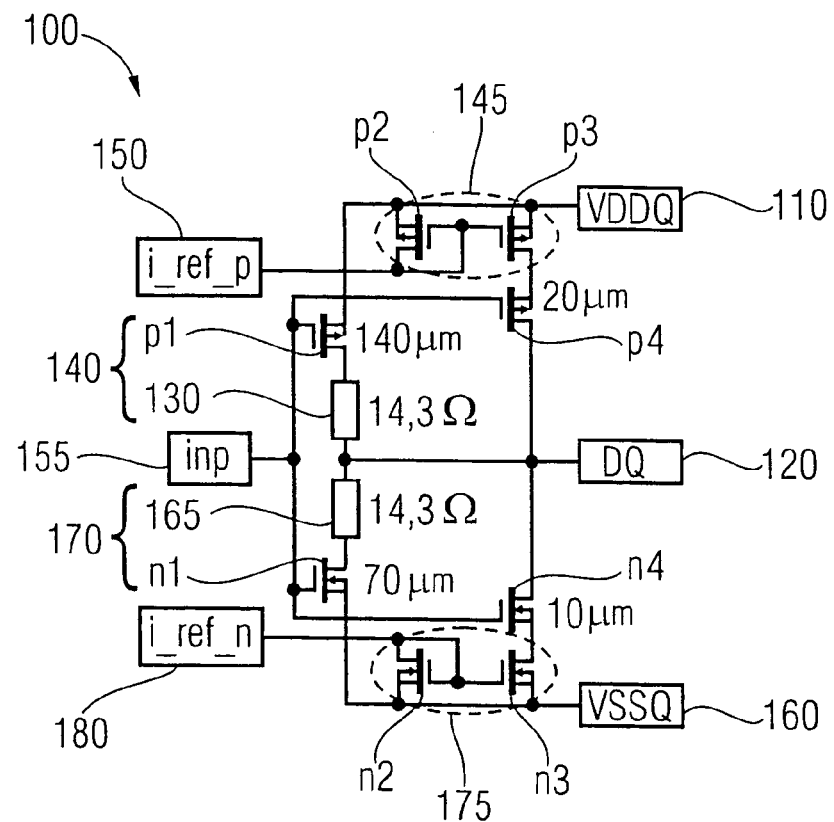
FIG. 2a shows a view of a push-pull driver using an apparatus according to an embodiment of the invention.

FIG. 2a shows a push-pull OCD according to an embodiment of the invention. In accordance with a conventional push-pull OCD, the OCD comprises a first reference potential node 110, an output node 120, a second reference voltage node 160, an input node 155, a first circuit 140 comprising a series connection of a transistor p1 and a resistor 130, which is connected between the reference voltage node 110 and the output node 120, and a second circuit 170 comprising a series connection of a transistor n1 and a resistor 165, which is connected between the second reference voltage node 160 and the output node 120. The gates of the transistors p1 and n1 are connected to the input node 155. Dependent on the state of the input signal on the input node 155, the transistor p1 connects the output node 120 to the reference voltage node 110 or the transistor n1 connects the output node 120 to the second reference voltage node 160. Normally, a high reference voltage VDDQ is applied to the first reference voltage node 110 and a low reference voltage VSSQ is applied to the second reference voltage node 160. The high reference voltage VDDQ may be 1.5 V and the low reference voltage may be ground. Accordingly, the voltage at the output node 120 depends on the logic level of a digital input signal at the input 155. In so far, the push-pull driver shown in FIG. 100 corresponds to a conventional push-pull driver.

According to the embodiment of the invention shown in FIG. 2a, a current source 145 is provided. The current source 145 comprises transistors p2 and p3, which are connected as a current mirror in a conventional manner. In other embodiments of the invention different current sources can be used. The current source 145 is connected between the first reference voltage node 110 and the output node 120 via a current source switching transistor p4. To be more specific, a source of the current source switching transistor p4 is connected to the output of the current source 145, the drain of the current source switching transistor p4 is connected to the output node 120 and the gate of the current source switching transistor p4 is connected to the input node 155. The input of the current source 145 is connected to a control current input node 150 for a control reference current i_ref_p.

Similarly, a current source 175 is connected between the second reference voltage node 160 and the output node 120 via a second current source switching transistor n4. To be more specific, the source of the second current source switching transistor n4 is connected to the output of the second current source 175, the drain of the second current source switching transistor n4 is connected to the output node 120, and the gate of the second current source switching transistor n4 is connected to the input node 155. The second current source 175 comprises two transistors n2 and n3 which are connected as a current mirror. The input of the current source 175 is connected to a control current input node 180 for a control reference current i_ref_n. The respective control reference current applied to the input of each current source 145 and 175 determines the adjustment current output at the output of each current source 145 and 175.

As can be derived from FIG. 2a, the first and second current source switching transistors p4 and n4 are much smaller (with respect to the channel width) when compared to the main switch transistors p1 and n1. Accordingly, the output impedance is defined mainly by the first circuit 140 or the second circuit 170. The transistors p4 and n4 each have an impedance in the on-state that is typically at least 5 times the impedance of the transistors p1 and n1, respectively, and preferably at least 10 times. For example, the size of the current source switching transistors can be less than ⅕ of the size of the main switching transistors p1 and n1.

In operation, the current source switching transistors n4 and p4 are driven simultaneously with the main switch transistors p1 and n1. Thus, if the transistor p1 is in the on-state, the current source switching transistor p4 is also in the on-state and connects the current source to the output node 120. Accordingly, an adjustment current is effected through the first circuit 140 dependent on the control reference current i_ref_p. This control reference current input at the reference current node 150 can be determined during a calibration procedure or can be determined on the fly during operation of the OCD. Preferably, the control reference current is continuously adjustable. The control reference current causes an adjustment current through the circuit 140 which is, accordingly, also continuously adjustable. If the circuit has a desired target impedance, the adjustment current would be zero. In other cases, the adjustment current causes such a current flow through the circuit that a voltage drop across the circuit takes place as if the circuit had the target impedance (with an unchanged reference voltage at the reference voltage node 110).

On the other hand, the second current source switching transistor n4 is driven simultaneously with the main switching transistor ni1, and therefore, provides for a adjustment current based on the control reference current i_ref_n for the circuit 170.

Accordingly, a tiny adjustment of the voltage swing at the output node 120 can be done by applying the necessary control reference current to the reference current nodes 150 and 180 and, therefore, to the current mirrors formed by the transistors p2, p3 and n2, n3, respectively. The control reference current i_ref_p and i_ref_n can be generated and adjusted with any desired accuracy without the need to gate any high speed signals. The output impedance of the OCD will substantially not depend from the state of the current source switching transistors p4 and n4 and from the level of the reference currents i_ref_p and i_ref_n since the differential impedance of the current mirrors is very high (>10 Kohm) in comparison with the impedance of the main push-pull part (which can be close to 50 Ohm, for example). In other embodiments, the differential impedance is at least 10 times and preferably 100 times the impedance of the main push-pull circuitry.

The main push-pull part (i.e., the switching transistors p1 and n1 along with the linearization resistors 130 and 165) could be implemented as described above with respect to FIG. 11a as a plurality of branches which can be enabled selectively in order to obtain a stepwise adjustment of the output impedance. In such embodiments, the variation of the reference current is able to smooth visible "steps" on the calibration characteristic and, therefore, a smooth continuous adjustment can be achieved.

Figure 2B:
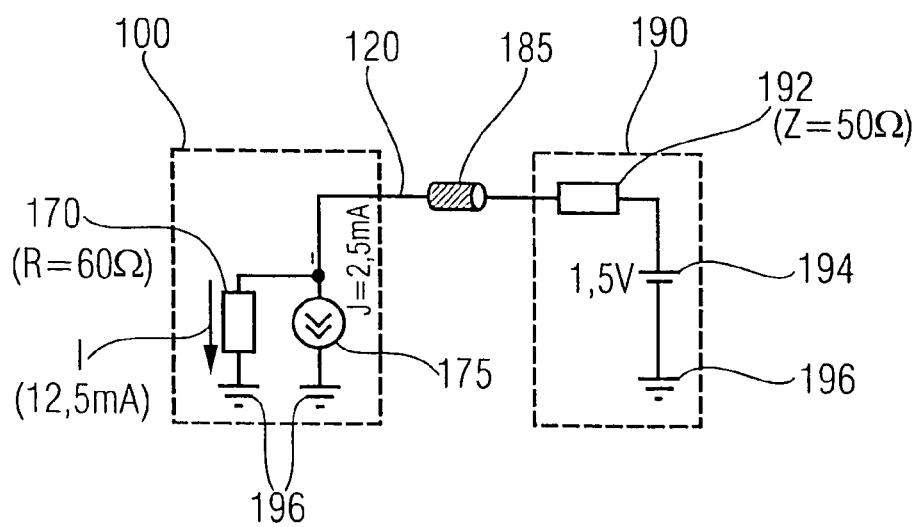

FIG. 2b shows a system comprising the OCD 100 of FIG. 2a, a signal line 185 comprising a first end connected to the output node 120 and a second end connected to a receiver 190.

In FIG. 2b, only those portions of the receiver pertinent for the understanding of the invention are shown. In this regard, FIG. 2b shows a termination resistor 192 and a power supply 194 connected between the termination resistor 192 and a reference potential 196. According to the embodiment shown in FIG. 2b, the lower reference voltage potential is ground.

The OCD may be formed on a DRAM chip located on a printed circuit board. Accordingly, the signal line 185 may be formed by a transmission line on the printed circuit board, and the receiver 190 can be formed by a processor chip on the printed circuit board, such as a memory controller.

In FIG. 2b a situation is shown in which the OCD 100 drives a logic level "0" onto the output node 120. Moreover, it is to be assumed that the switching transistor n1 of the OCD is mis-calibrated to 60 Ohm instead of 50 Ohm. Under the assumption of voltage levels as explained above with respect to FIG. 10, the voltage swing on the output node 120 will be 680 mV instead of 750 mV. Accordingly, the optimum Vref (at the receivers) will be 1.16 V instead of 1.125 V. In such case, the control reference current i_ref_n to the current source 175 would be adjusted such that the current source provides for an additional current of 2.5 mA. Accordingly, the output swing, the voltage drop across the circuit 170, would be changed to be 750 mV and the reference voltage of 1.125 V would be obtained.

In embodiments of the invention, the control reference current can be provided by a digital-to-analog converter or an analog-to-digital converter which can provide a current with a resolution of 16 digits or more. Accordingly, the current source can be controlled with a very high accuracy, wherein even 10 or more digit resolution is possible without incurring major problems.

Figure 3A:
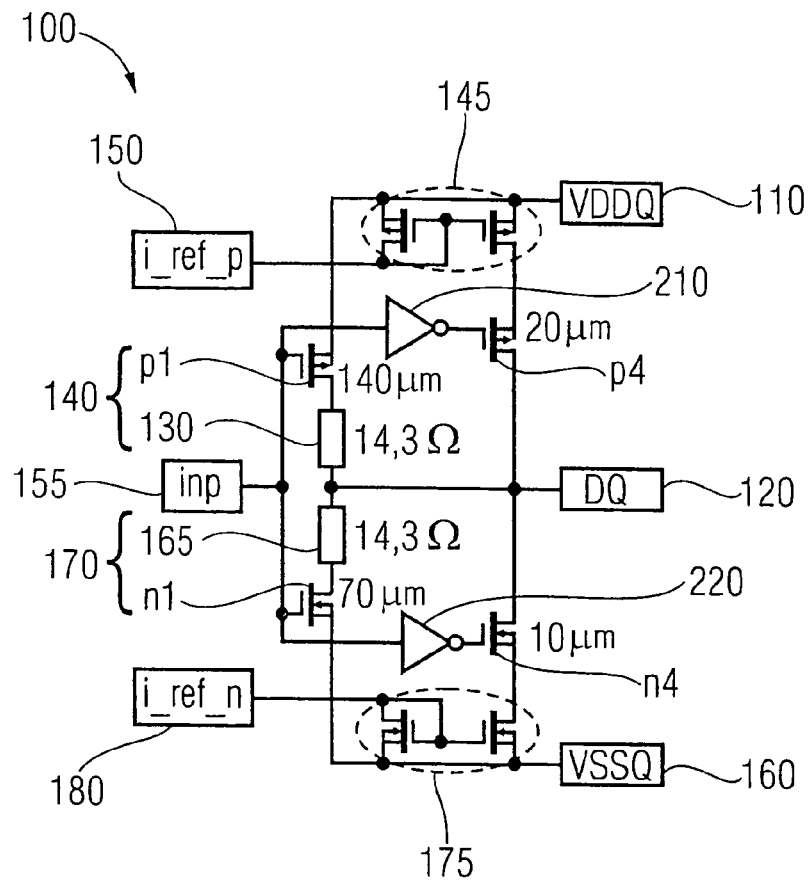
FIG. 3a shows a view of a push-pull driver using an apparatus according to another embodiment of the invention.
Figure 3B:
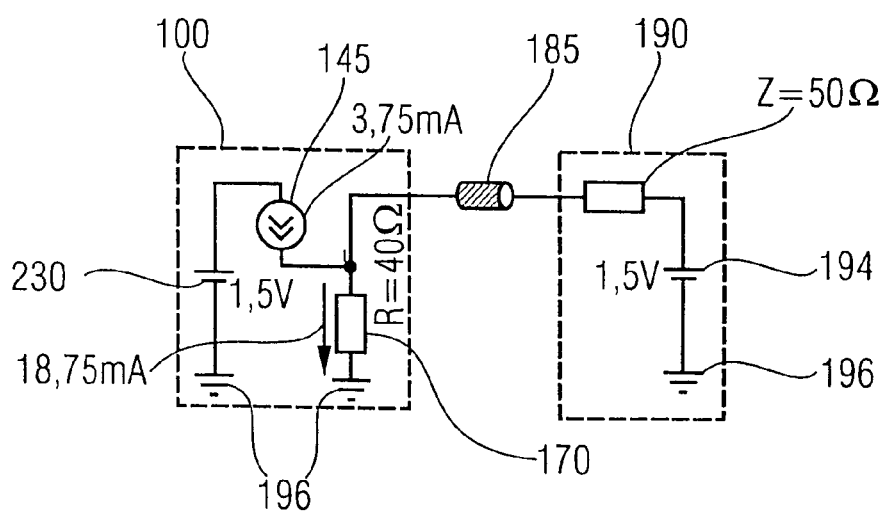

FIGS. 3a and 3b show an embodiment of a push-pull circuit according to the invention in which the resistance of the main push-pull parts, i.e. the circuits 140 and 170, is lower than a target impedance, for example 40 Ohm instead of 50 Ohm. In this case, the signal swing can also be corrected, but the polarity of the current has to be changed. To be more specific, the gate signals for the current source switching transistors p4 and n4 have to be inverted when compared to the case shown in FIGS. 2a and 2b. This is achieved by a first inverter 210 connected between the gate of the first current source switching transistor p4 and the input node 155 and a second inverter 120 connected between the gate of the second current source switching transistor n4 and the input node 155. Thus, the first current source switching transistor p4 is switched in synchronism with the second main switching transistor n1 and the second current source switching transistor n4 is switched in synchronism with the first main switching transistor p1.

In FIG. 3b a situation is shown, in which the resistance of the circuit 170 is 40 Ohm. Accordingly, the voltage drop across the circuit 170 is too low and an additional current has to be provided by the current source 145 connected to the high reference voltage indicated in FIG. 3b by a voltage source 230. In the embodiment shown, the control reference current applied to the reference current node 150 (see FIG. 3a) is adjusted such that the current source 145 provides for an adjustment current of 3.75 mA which, in addition to the current flow of 18.75 mA, results in a current through the circuit 170 which yields the desired voltage drop (as if the circuit 170 had the correct resistance of 50 Ohm).

Figure 4:
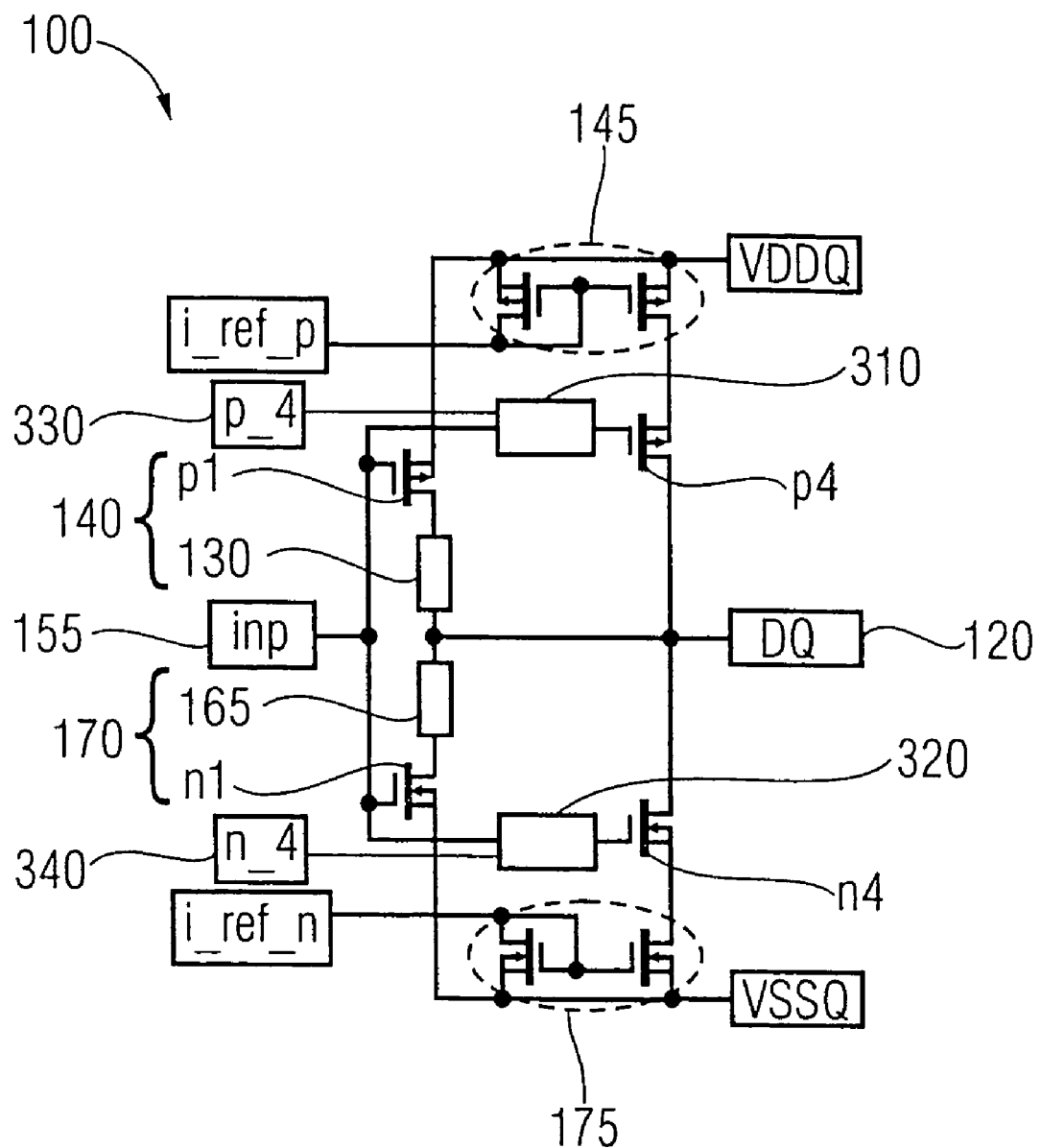
FIGS. 4 and 5 show views of push-pull drivers using an apparatus according to other embodiments of the invention.

FIG. 4 shows another embodiment of an inventive push-pull driver, which permits for the possibility of compensating both, too high resistances of the circuits 140 and 170 and too low resistances of the circuits 140 and 170. In other words, the embodiment shown in FIG. 4 permits for a compensation of wrong calibrations in both directions. To this end, the inverters of FIG. 3a are replaced by respective logic gates 310 and 320. The logic gate 310 comprises an logic signal input 330 and the logic gate 320 comprises a logic signal input 340. Logic signals applied to the logic signal inputs 330 and 340 indicate into which direction a compensation has to take place. To be more specific, the logic signals received at the logic signal inputs 330 and 340 indicate whether the respective resistance of the circuit 140 and/or 170 is too high or too low and, therefore, which of the current sources 145 and 175 have to be connected to the output node 120 for compensation. The logic gates 310 and 320 could comprise XOR gates, for example.

According to further embodiments of the invention, similar functionality could be obtained by two additional current source switching transistors connected in parallel to the first and second current source switching transistors p4 and n4. The additional current source switching transistors could be connected to the input node 155 in an appropriate manner (making use of inverters, for example), so that compensation in the appropriate direction can be obtained in case of both, too high resistances or to low resistances of the circuits 140 and 170.

Figure 5:
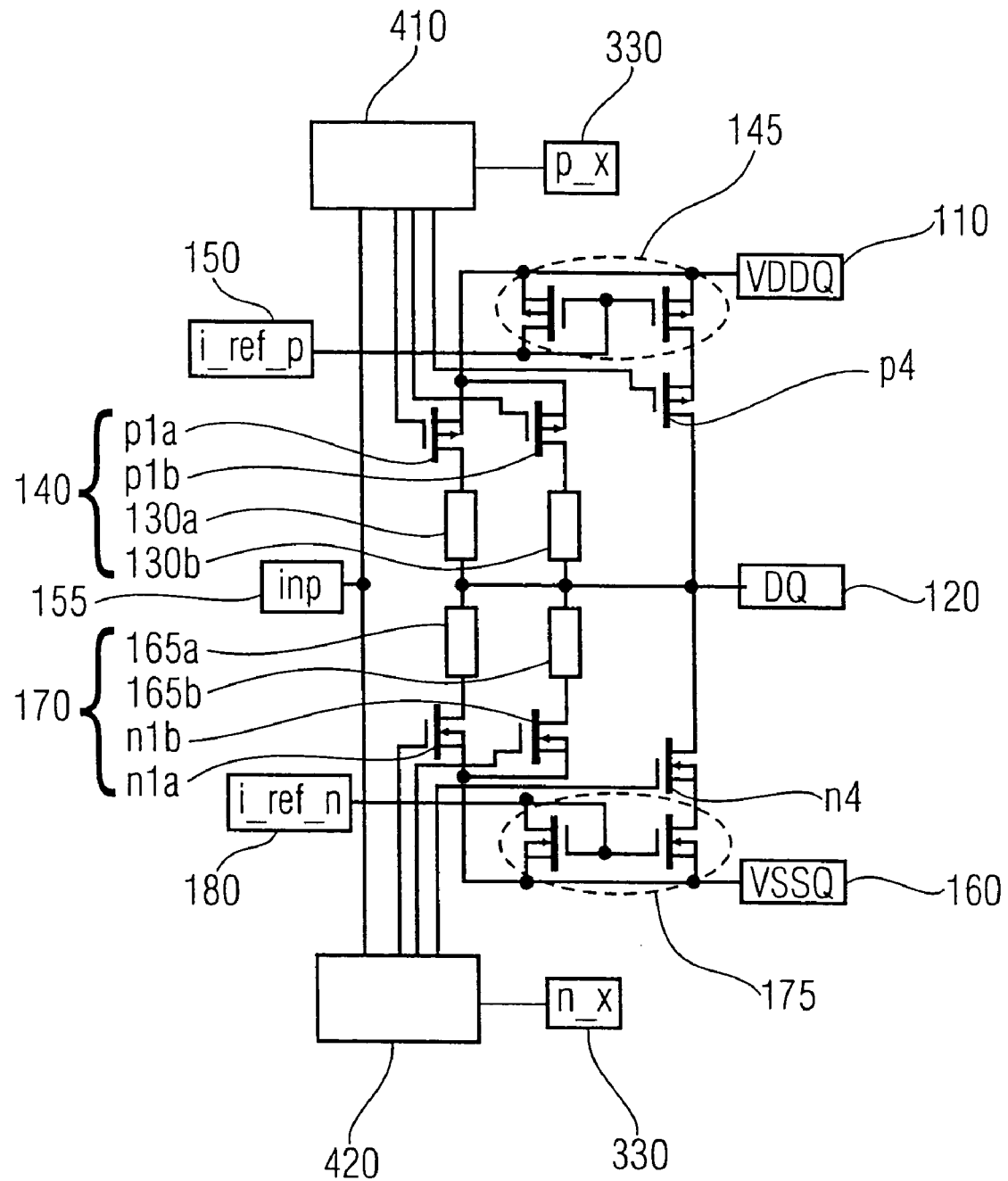

FIG. 5 shows an embodiment of a push-pull circuit combining a stepwise calibration in a manner as explained above referring to FIGS. 11a and 11b and a tiny adjustment by a control reference current. According to FIG. 5, the first circuit 140 comprises a first branch of a transistor p1a and a resistor 130a and a second branch comprising a transistor p1b and a resistor 130b, wherein the branches are connected in parallel. Similarly, the circuit 170 comprises a first branch comprising a transistor n1a and a resistor 165a and a second branch comprising a transistor n1b and a resistor 165b, wherein both branches are connected in parallel. Two respective branches (corresponding to two digits) are shown in FIG. 5. However, it is clear that a greater number of branches can be provided (such as three branches as shown in FIG. 11a, for example).

The transistors p1a, p1b, n1a and n1b represent main switching transistors. During calibration of the OCD it is determined which of the main switching transistors have to be used in order to obtain a desired output impedance as explained above with respect to FIG. 11a. Moreover, levels of control reference currents to be applied to the reference current inputs 150 and 180 are determined during the calibration method in order to obtain a tiny adjustment.

Outputs of a controller 410 are connected to the gates of the transistors p1a, p1b and p4. Outputs of a controller 420 are connected to the gates of the transistors n1a, n1b and n4. Inputs of the controllers 410 and 420 are connected to the input node 155. The controllers 410 and 420 are configured to control the outputs such that the respective transistors are turned-on or turned-off according to a level of the input signal on the input node 155 and dependent on the results of the calibration procedure, i.e., dependent on the actual impedance conditions.

Accordingly, the embodiment shown in FIG. 5 permits a combination of the stepwise calibration described above with respect to FIGS. 11a and 11b and the fine adjustment making use of a control reference current as described above with respect to FIGS. 1 to 4.

Figure 6:
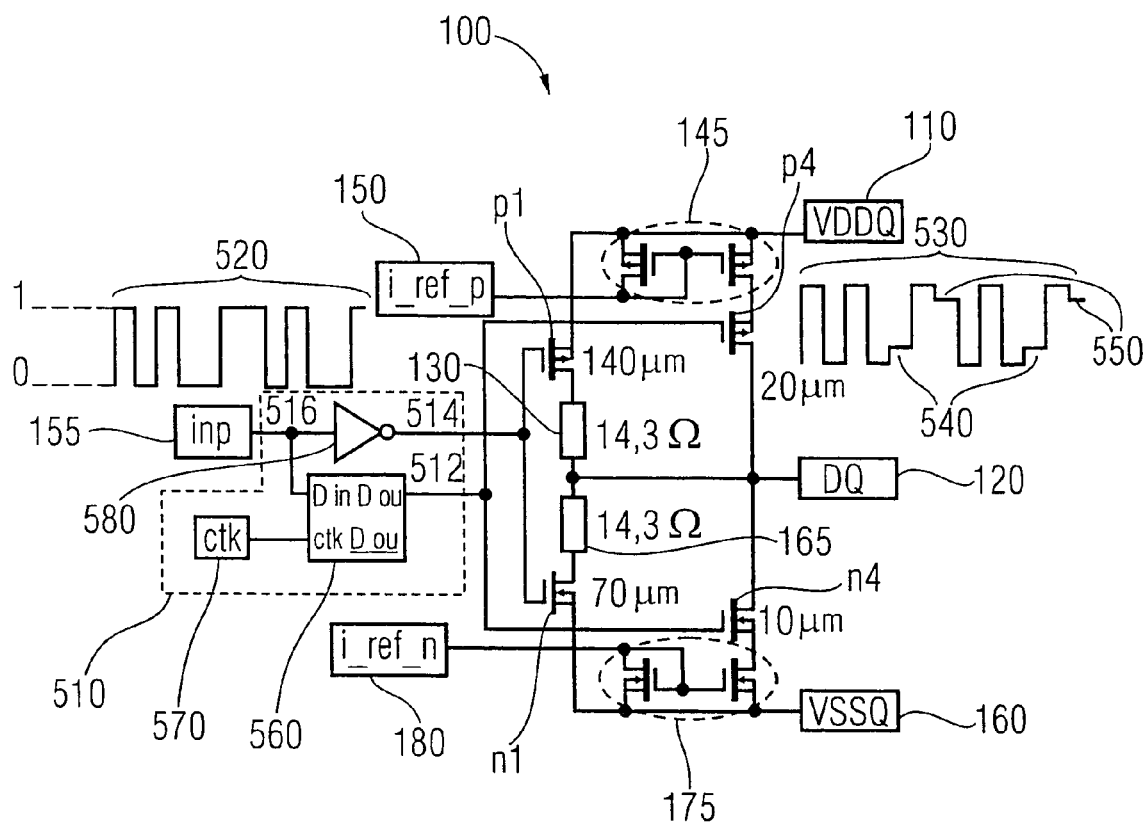
FIG. 6 shows a view of a push-pull driver using an apparatus according to another embodiment of the invention permitting pre-emphasis of specific signal levels.

In FIG. 6, an embodiment of an inventive apparatus is shown, in which a pre-distortion of specific signal parts of a signal output on the output node 120 is performed. To be more specific, FIG. 6 shows an embodiment, in which a pre-distortion of the output signal is effected in order to compensate for an effect, in which each first "1" symbol or "0" symbol in a sequence has a slightly higher amplitude than the other symbols. Such pre-distortions can be referred to as a pre-emphasis.

According to FIG. 6, the gates of the current source switching transistors p4 and n4 are connected to a first output 512 of a controller 510, and the gates of the main switching transistors p1 and n1 are connected to a second output 514 of the controller 510. Moreover, an input 516 of the controller is connected to the input node 155. An inverter 580 is connected between the input 516 and the second output 514 of the controller 510. The controller further comprises a D-flip-flop 560 with a clock input for a clock signal 570 and a data input connected to the input 516. A data output of the D-flip-flop is connected to the first output 512 of the controller 510.

In operation, a sequence 520 of "1's" and "0's" are received at the input node 155. The inverter 580 delays the signal by one symbol interval and causes inversion thereof. The delayed and inverted signal is applied to the gates of the main switching transistors p1 and n1. Moreover, the input signal is applied to the data input of the D-flip-flop 560, the output of which is connected to the gates of the current source switching transistors p4 and n4. Accordingly, a pre-emphasis of an output signal 530 on the output node 120 is obtained. To be more specific, the distorted output signal 530 differs from the digital input signal 520 by a positive pre-emphasis 540 and by a negative pre-emphasis 550. The pre-emphasis shown in FIG. 6 is effective to compensate for the slightly higher amplitudes occurring after a series of "0" symbols or "1"-symbols, resulting in an increased consistency of the high frequency spectral harmonics.

The level of the pre-emphasis can be easily adjusted by varying the control reference currents applied to the reference current nodes 150 and 180. Such an approach has a substantial advantage in comparison with known solutions since the output impedance of the OCD can be maintained unchanged, independent of the pre-emphasis level. For example, in a memory system, signal line lengths between each of a plurality of memory chips and a memory controller may vary. This requires different pre-emphasis settings since an optimum pre-emphasis level strongly depends on high-frequency losses of the signal line and, therefore, the length thereof.

Figure 7A:
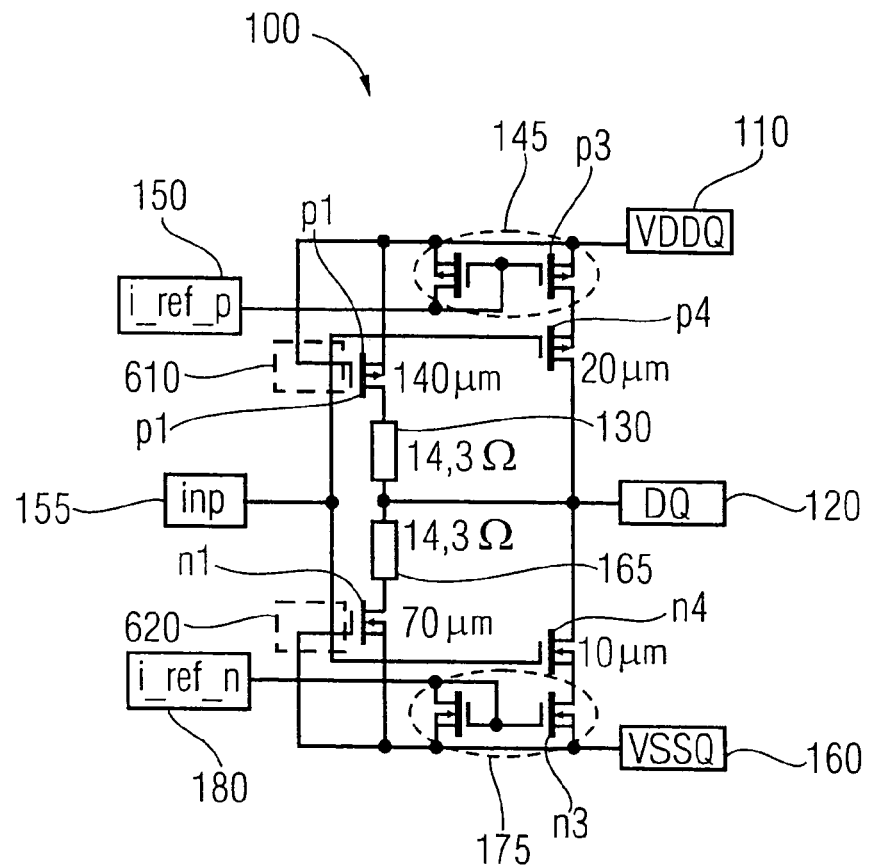
FIG. 7a shows a view of a push-pull driver comprising a lower power mode, which uses an apparatus according to another embodiment of the invention.

FIG. 7*a* shows an OCD according to another embodiment of the invention in a low power mode. In the low power mode, the gate of the first main switching transistor p1 is connected to the first reference voltage node 10 and the gate of the second main switching transistor n1 is connected to the second reference voltage node 160. Accordingly, the main push-pull part is switched off in the low power mode.

Figures 7B, 7C:
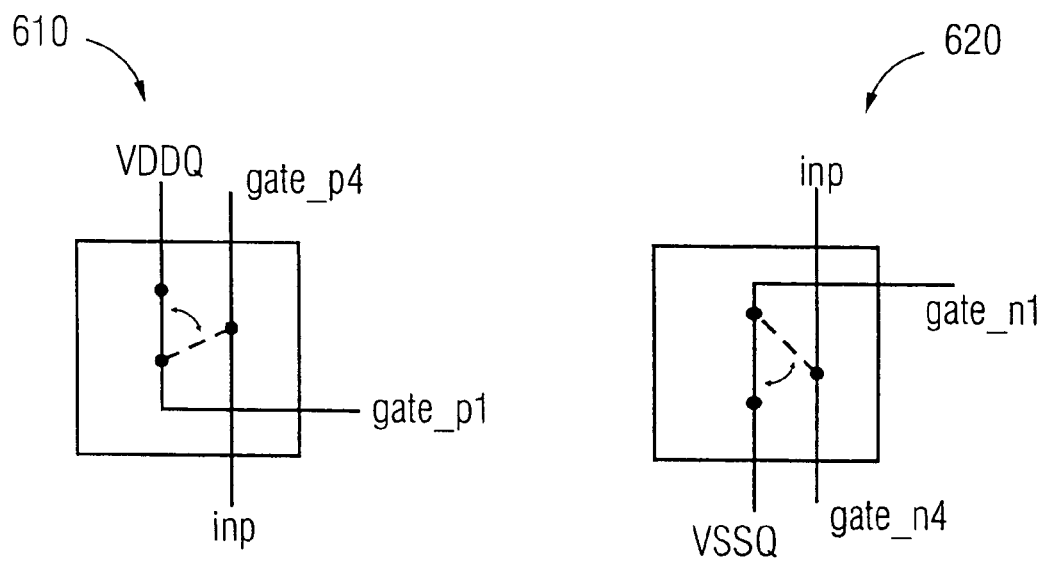

In order to permit switching between a normal mode and a low power mode, a first mode switch 610 and a second mode switch 620 may be provided. Exemplary embodiments of such switches are shown in FIGS. 7*b* and 7*c*.

In the normal operation mode, the state of the switch 610 is such that the gate of the main switching transistor p1 is connected to the input node 155 and the gate of the first current source switching transistor p4. In the low power mode, the state of the switch 610 is such that the gate of the main switching transistor p1 is disconnected from the input node and the gate of the first current source switching transistor p4 and connected to the first reference voltage node 110.

In the normal operation mode, the switching state of the second mode switch 620 is such that the gate of the second main switching transistor n1 is connected to the input node 155 and the gate of the second current source switching transistor n4. In the low frequency, low power mode, the switching state of the second mode switch 620 is such that the gate of the second main switching transistor n1 is disconnected from the input node 155 and the gate of the second current source switching transistor n4 and is connected to the second reference voltage node 160. A low power mode using a reduced operation frequency may also be referred to as a low frequency, low power mode.

Such a low power mode is used in some DRAM types such as those provided for PDAs (personal digital assistance), for compact game consoles or for mobile phones. As described above with respect to FIG. 7*a* to 7*c*, such a low power mode is easily realized by switching off the main push-pull part comprising the transistors p1 and n1. The transistor p3 in the current source 145 and the transistor n3 in the current source 175 can be moved from an active mode to a fully opened state. The resulting strength of the OCD will be defined by the first current source switching transistor p4 and the second current source switching transistor n4, which comprise a small channel width when compared to the main switching transistors p1 and n1. Accordingly, in the low frequency, low power mode, the OCD will exhibit an output impedance substantially larger than the output impedance in the normal operation mode, such as 500 Ohm or even higher in the low power mode when compared to 50 Ohm in the normal operation mode. This higher resistance will restrict current consumption and, therefore, enables saving of power:

In normal operation mode, the off-chip driver 100 can be operated at frequencies of 1, 2 or 4 GHz, for example. However, there may be applications with reduced frequencies, such as in mobile phones. For such reduced frequencies, a reduced voltage swing at the output node may be sufficient. For such applications, the present invention provides for the possibility of adjusting the control reference current such that a desired reduced voltage swing at the output node is achieved (making use of the circuitry shown in FIG. 2*a*, for example).

Figure 12:
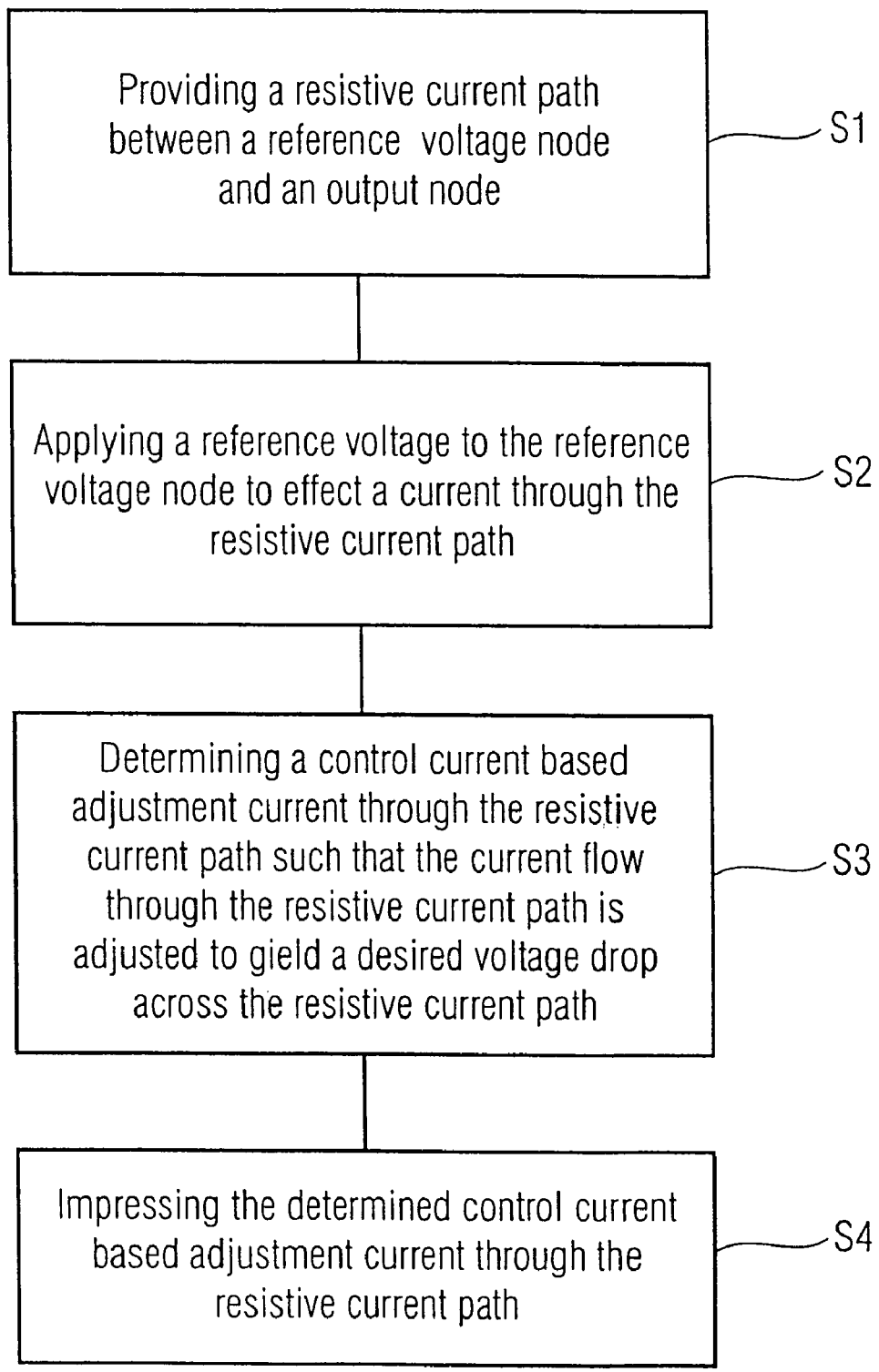
FIG. 12 shows a flowchart of a method for adjusting the level of a voltage drop according to an embodiment of the invention.

An embodiment of an inventive method of adjusting the voltage drop across a driver circuit is shown in FIG. 12 and includes a step S1 of providing a resistive current path, a step S2 of applying a reference voltage to a reference voltage node, a step S3 of determining a required control current and a step S4 of impressing the required control current.

Accordingly, the present invention provides for the possibility of adjusting the voltage drop across a circuit without substantially changing the output impedance of the circuit. To be more specific, the inventive effect is not obtained by changing the output impedance of the circuit, but by providing an additional adjustment current based on a control reference current to the output node or through the circuit such that the current flow through the circuit is adjusted to yield a desired voltage drop across the circuit. In embodiments of the invention, supplying the additional adjustment current is effected in such a manner that the output impedance of the circuit is not remarkably changed, i.e., the influence to the output impedance can be negligible.

For determining a required control reference current, the actual voltage drop across the driver circuit, i.e., the voltage drop at the output node 120 can be detected. The actual voltage drop is compared to a target voltage drop and the control reference current is adjusted until the actual voltage drop corresponds to the target voltage drop. Such an approach can be performed for each of the control reference currents described above referring to the different embodiments of the invention. Then, in operation, the control reference current resulting in the target voltage drop is applied to the respective control reference current input.

Generally, the voltage drop across the driver circuit depends on the temperature, the operation voltage, the load impedance, variations due to the technology used and even variations of the performance of the driver circuit with time. Therefore, it is advantageous to perform a calibration procedure at normal working conditions. In embodiments of the present invention, calibration is achieved by means of a feedback control of the control current which is performed in order to compensate for variations of the voltage drop. Corresponding circuitry for obtaining such a feedback control of the control current can be implemented on the integrated circuit device including the driving circuit. The feedback control can be based on any appropriate feedback signal which depends on the actual voltage drop. For example, there could be feedback from the destination that receives a signal from the output node, such as based upon the position of the digital eye at the receiver side. Structures of feedback loops appropriate for achieving such a feedback control are known to persons skilled in the art and need not be further discussed herein.

Accordingly, the control reference currents can be continuously adjusted and can be applied by any appropriate means, a digital-to-analog converter, for example.

Changing the binary calibration code for conventional OCDs is only allowed when the chip is not transmitting data. In DRAM chips changing is done only during an auto-refresh cycle. In conventional systems, updating the calibration code during normal operation could cause transient impedance violations and, therefore, data corruption. Contrary thereto, the present invention permits for a change of the control current and, therefore, of the voltage swing, on the fly during the operation of the driver.

The present invention permits for the adjustment of a voltage drop, the voltage swing on the output node of a driver, for example, in a continuous, i.e., stepless, manner. Such an adjustment can be achieved without adding excessive complexity to a given chip. Thus, the inventive approach is cost efficient and very reliable.

Depending on certain implementation requirements of the inventive methods, the inventive methods can be implemented in hardware or in software. The implementation can be performed using a digital storage medium, in particular a disc or a CD having electronically readable control signals stored thereon, which cooperate with a programmable computer system such that the inventive methods are performed. Generally, the present invention can be, therefore, a computer program product with a program code stored on a machine-readable carrier, the program code being operated for performing the inventive method when the computer program product runs on a computer. In other words, the inventive methods can be, therefore, a computer program having a program code for performing at least one of the inventive methods when the computer program runs on a computer. For example, an SVGA card driver program of a videocard could control power saving features of the videocard by controlling the control current.

The foregoing detailed description is merely illustrative of several embodiments of the invention. Variations of the described embodiments may be encompassed within the purview of the claims. Accordingly, any description of the embodiments in the specification should be used for general guidance, rather than to unduly restrict any broader descriptions of the elements in the following claims.

What is claimed is:

1. An integrated circuit including a circuit for adjusting a voltage drop, comprising:
   a reference voltage node;
   an output node;
   a driver circuit coupled between the reference voltage node and the output node and comprising an impedance causing a current flow through the driver circuit when a reference voltage is applied to the reference voltage node; and
   a current source coupled to the driver circuit to impress an adjustment current based on a control current such that the current flow through the driver circuit is adjusted to yield a desired voltage drop across the driver circuits,
   wherein the current source comprises a current mirror connected between the reference voltage node and the driver circuit or between a further reference voltage node and the driver circuit, wherein the current mirror comprises a current input for a control reference current from which the adjustment current is derived.

2. The integrated circuit according to claim 1, wherein the driver circuit comprises a first switching transistor between the reference voltage node and the output node, wherein a control terminal of the first switching transistor is coupled to an input node.

3. The integrated circuit according to claim 2, further comprising a current source switching transistor comprising a control input coupled to the input node, wherein the current source switching transistor is coupled between the current source and the driver circuit, and wherein switching states of the first switching transistor and the current source switching transistor are equal to each other.

4. The integrated circuit according to claim 2, further comprising:
   a further reference voltage node;
   a further driver circuit coupled between the further reference voltage node and the output node and comprising a further impedance causing a current flow through the further driver circuit when a further reference voltage is applied to the further reference voltage node; and
   a further current source coupled to the further driver circuit to impress a further adjustment current based on a further control current such that the current flow through the further driver circuit is adjusted to yield a further desired voltage drop across the further driver circuit.

5. The integrated circuit according to claim 4, wherein the further driver circuit comprises a second switching transistor between the output node and a further reference voltage node, wherein a control terminal of the second switching transistor is coupled to the input node and wherein switching states of the first and second switching transistors are opposite to each other.

6. The integrated circuit according to claim 5, comprising a further current source switching transistor comprising a control input coupled to the input node, the further current source switching transistor being coupled between the further current source and the further driver circuit and wherein switching states of the further current source switching transistor and the second switching transistor are equal to each other.

7. The integrated circuit according to claim 1, wherein the adjustment current is adjustable in a stepless manner.

8. The integrated circuit according to claim 1, wherein the driver circuit comprises a resistance coupled between the reference voltage node and the output node.

9. An integrated circuit including a circuit for adjusting a voltage drop, comprising:
   a reference voltage node;
   an output node;
   a driver circuit coupled between the reference voltage node and the output node and comprising an impedance causing a current flow through the driver circuit when a reference voltage is applied to the reference voltage node, wherein the driver circuit comprises a first switching transistor between the reference voltage node and the output node, wherein a control terminal of the first switching transistor is coupled to an input node;
   a current source coupled to the driver circuit to impress an adjustment current based on a control current such that the current flow through the driver circuit is adjusted to yield a desired voltage drop across the driver circuit;
   a further reference voltage node;
   a further driver circuit coupled between the further reference voltage node and the output node and comprising a further impedance causing a current flow through the further driver circuit when a further reference voltage is applied to the further reference voltage node; and
   a further current source coupled to the further driver circuit to impress a further adjustment current based on a further control current such that the current flow through the further driver circuit is adjusted to yield a further desired voltage drop across the further driver circuit,
   wherein the further current source comprises a current mirror coupled between the further reference voltage node and the further driver circuit or between the reference voltage node and the further driver circuit, the current mirror comprising a current input for a further control reference current from which the further adjustment current is derived.

10. An integrated circuit including a circuit for adjusting a voltage drop, comprising:
a reference voltage node;
an output node;
a driver circuit coupled between the reference voltage node and the output node and comprising an impedance causing a current flow through the driver circuit when a reference voltage is applied to the reference voltage node; and
a current source coupled to the driver circuit to impress an adjustment current based on a control current such that the current flow through the driver circuit is adjusted to yield a desired voltage drop across the driver circuit,
wherein impedance of the driver circuit deviates from a target impedance and wherein the adjustment current is such that the level of the voltage drop across the driver circuit corresponds to a level of a voltage drop across the target impedance, which is caused by the reference voltage without the adjustment current, within a tolerance of below plus or minus 20%.

11. An integrated circuit including a circuit for adjusting a voltage drop, comprising:
a reference voltage node;
an output node;
a driver circuit coupled between the reference voltage node and the output node and comprising an impedance causing a current flow through the driver circuit when a reference voltage is applied to the reference voltage node; and
a current source coupled to the driver circuit to impress an adjustment current based on a control current such that the current flow through the driver circuit is adjusted to yield a desired voltage drop across the driver circuit,
wherein the current source is a first current source, further comprising a second current source and a logic gate coupling the first or the second current sources to the driver circuit dependent on whether the impedance of the driver circuit is higher or lower than a target impedance.

12. An integrated circuit including a circuit for adjusting a voltage drop, comprising:
a reference voltage node;
an output node;
a driver circuit coupled between the reference voltage node and the output node and comprising an impedance causing a current flow through the driver circuit when a reference voltage is applied to the reference voltage node;
a current source coupled to the driver circuit to impress an adjustment current based on a control current such that the current flow through the driver circuit is adjusted to yield a desired voltage drop across the driver circuit; and
a controller and a current source switching transistor coupled between the current source and the driver circuit, wherein a control input of the current source switching transistor is connected to an output of the controller and is controlled such that the current source provides for predistortion of specific signal states on the output node.

13. The integrated circuit according to claim 12, wherein the controller comprises a D-flip-flop comprising a clock input coupled to a clock signal, a data input coupled to an input node and an output coupled to the control input of the current source switching transistor.

14. An integrated circuit including a circuit for adjusting a voltage drop, comprising:
a reference voltage node;
an output node;
a driver circuit coupled between the reference voltage node and the output node and comprising an impedance causing a current flow through the driver circuit when a reference voltage is applied to the reference voltage node;
a current source coupled to the driver circuit to impress an adjustment current based on a control current such that the current flow through the driver circuit is adjusted to yield a desired voltage drop across the driver circuit; and
an operation mode switch coupled to a control input of a switching transistor of the driver circuit to switch the control input between an input node and the reference voltage node.

15. An integrated circuit including a circuit for adjusting a voltage drop, comprising:
a reference voltage node;
an output node;
a driver circuit coupled between the reference voltage node and the output node and comprising an impedance causing a current flow through the driver circuit when a reference voltage is applied to the reference voltage node;
a current source coupled to the driver circuit to impress an adjustment current based on a control current such that the current flow through the driver circuit is adjusted to yield a desired voltage drop across the driver circuit; and
a third driver circuit coupled between the reference voltage node and the output node, the third driver circuit comprising a third switching transistor, wherein switching states of the first and switching states of the third switching transistors are controllable by a logic gate, such that, depending on the switching states of the first and third switching transistors, a voltage state on the output node is changeable stepwise.

16. An integrated circuit having at least one output circuit, the integrated circuit comprising:
an output node;
a first reference voltage node;
a second reference voltage node;
a first driver circuit coupled between the first reference voltage node and the output node, the first driver circuit comprising a first switching transistor;
a second driver circuit coupled between the second reference voltage node and the output node, the second driver circuit comprising a second switching transistor, wherein switching states of the first and second transistors are opposite to each other to bring the output node to a first voltage state or a second voltage state dependent on the switching states of the first and second switching transistors; and
a first current source to impress a control current based adjustment current through the first driver circuit when the first switching transistor is closed such that a current flow through the first driver circuit is adjusted to yield a desired first voltage state on the output node,
wherein the first current source comprises a current mirror and a current source switching transistor, wherein the current source switching transistor is coupled between the current mirror and the driver circuit and comprises a control input coupled to an input node, the current mirror comprising a current input for a control reference current from which the adjustment current is derived such that the adjustment current is continuously adjustable by changing the control reference current.

17. The integrated circuit according to claim 16, further comprising a second current source to impress another control current based adjustment current through the second driver circuit when the second switching transistor is closed such that a current flow through the second driver circuit is adjusted to yield a desired second voltage state on the output node.

18. The integrated circuit according to claim 16, wherein the first switching transistor represents, in an on state, a first resistance and the current source switching transistor represents, in an on state, a second resistance, wherein the second resistance is n times higher than the first resistance, wherein n>2.

19. The integrated circuit according to claim 16, wherein the current mirror comprises a differential resistance, which is m times higher than an output impedance of said first driver circuit, wherein m>50.

20. The integrated circuit according to claim 16, the output circuit further comprising
a third driver circuit coupled between the first reference voltage node and the output node, the third driver circuit comprising a third switching transistor,
wherein the switching states of the first and switching states of the third switching transistors are controlled by a logic gate, such that depending on the switching states of the first and third switching transistor the first voltage state on the output node is changeable stepwise.

21. An apparatus for adjusting a level of a voltage drop, the apparatus comprising:
means for providing a reference voltage;
means for providing a resistive current path between the means for providing the reference voltage and an output node;
means for impressing a control current based adjustment current through the resistive current path such that a current flow through the resistive current path yields a desired voltage state on the output node; and
a logic gate coupling the adjustment current to the resistive current path dependent on whether a resistance of the resistive current path is higher or lower than a target resistance.

22. The apparatus according to claim 21, further comprising:
means for providing a further reference voltage;
means for providing a further resistive current path between the means for providing the further reference voltage and the output node; and
means for impressing a further control current based adjustment current through the further resistive current path such that a current flow through the further resistive current path yields a further desired voltage state on the output node.

23. The apparatus according to claim 22, further comprising a further logic gate coupling the further adjustment current to the resistive current path dependent on whether a resistance of the resistive current path is higher or lower than a target resistance.

24. A method for adjusting a level of a voltage drop, the method comprising:
providing a reference voltage at a reference voltage node;
providing a resistive current path between the reference voltage node and an output node such that a current flow through the resistive current path is effected by said reference voltage; and
impressing a control current based adjustment current through the resistive current path such that the current flow through the resistive current path is adjusted to yield a desired voltage state on the output node,
wherein providing a control current based adjustment current comprises applying a control reference current to an input of a current mirror, wherein the control reference current and, therefore, the adjustment current, is adjustable in a stepless manner.

25. The method according to claim 24, further comprising:
providing a further reference voltage at a further reference voltage node;
providing a further resistive current path between the further reference voltage node and the output node such that a current flow through the further resistive current path is effected by said further reference voltage; and
impressing a further control current based adjustment current through the further resistive current path such that the current flow through the resistive current path is adjusted to yield a further desired voltage state on the output node.

26. A method for adjusting a level of a voltage drop, the method comprising:
providing a reference voltage at a reference voltage node;
providing a resistive current path between the reference voltage node and an output node such that a current flow through the resistive current path is effected by said reference voltage;
impressing a control current based adjustment current through the resistive current path such that the current flow through the resistive current path is adjusted to yield a desired voltage state on the output node; and
determining a resistance of the resistive current path and adjusting the control current based on the determined resistance.

27. A computer program with a program code to execute the method according to claim 24, when the computer program is executed on a computer.

* * * * *